(12) United States Patent
Fujii et al.

(10) Patent No.: US 10,001,206 B2
(45) Date of Patent: *Jun. 19, 2018

(54) POWER TRANSMISSION SYSTEM FOR VEHICLE

(71) Applicant: TOYOTA JIDOSHA KABUSHIKI KAISHA, Toyota-shi, Aichi-ken (JP)

(72) Inventors: Kota Fujii, Toyota (JP); Yuji Yasuda, Miyoshi (JP); Atsushi Tabata, Okazaki (JP); Haruhisa Suzuki, Nagoya (JP); Koichi Okuda, Toyota (JP); Hiroyuki Tateno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/365,504

(22) Filed: Nov. 30, 2016

(65) Prior Publication Data

US 2017/0167592 A1 Jun. 15, 2017

(30) Foreign Application Priority Data

Dec. 10, 2015 (JP) .................................. 2015-241633

(51) Int. Cl.
*F16H 57/00* (2012.01)
*F16H 57/12* (2006.01)
(Continued)

(52) U.S. Cl.
CPC ......... *F16H 57/0006* (2013.01); *F16H 57/12* (2013.01); *B60K 6/365* (2013.01);
(Continued)

(58) Field of Classification Search
CPC ................ F16H 57/0006; F16H 57/12; F16H 2200/201; F16H 2200/2082;
(Continued)

(56) References Cited

U.S. PATENT DOCUMENTS 1,892,037 A * 12/1932 Crews ....................... F16D 3/76
464/89
3,700,271 A * 10/1972 Blaurock .............. F16D 1/0835
403/372
(Continued)

FOREIGN PATENT DOCUMENTS

JP H04-362346 A 12/1992
JP H09-20256 A 1/1997
(Continued)

OTHER PUBLICATIONS

May 30, 2017 Office Action issued in U.S. Appl. No. 15/365,304.
Oct. 30, 2017 Office Action issued in U.S. Appl. No. 15/365,304.

*Primary Examiner* — Victor L MacArthur
(74) *Attorney, Agent, or Firm* — Oliff PLC (57) ABSTRACT

A tolerance ring is arranged between an output-side rotary shaft and a rotor shaft. For this reason, even when looseness in a spline fitting portion of the output-side rotary shaft and rotor shaft is not filled, both the output-side rotary shaft and the rotor shaft are held by the tolerance ring so as not to rattle. Therefore, it is possible to reduce tooth hammer noise that occurs in the spline fitting portion.

4 Claims, 7 Drawing Sheets

(51) Int. Cl.
 *B60K 6/365* (2007.10)
 *B60K 6/442* (2007.10)
 *B60K 6/547* (2007.10)
 *F16H 3/72* (2006.01)

(52) U.S. Cl.
 CPC .............. *B60K 6/442* (2013.01); *B60K 6/547* (2013.01); *B60Y 2200/92* (2013.01); *B60Y 2306/09* (2013.01); *B60Y 2400/73* (2013.01); *F16H 3/728* (2013.01); *F16H 2200/0043* (2013.01); *F16H 2200/201* (2013.01); *F16H 2200/2043* (2013.01); *F16H 2200/2066* (2013.01); *F16H 2200/2082* (2013.01); *Y10S 903/911* (2013.01); *Y10S 903/919* (2013.01)

(58) Field of Classification Search
 CPC ..... F16H 2200/2043; F16H 2200/2066; F16H 2200/0043; F16H 3/728; B60Y 2306/09; B60Y 2200/92; Y10S 903/919; Y10S 903/911; B60K 6/547; B60K 6/442; B60K 6/365
 See application file for complete search history.

(56) References Cited

U.S. PATENT DOCUMENTS

| | | | | |
|---|---|---|---|---|
| 4,136,982 A * | 1/1979 | Sagady | ............... | F16B 21/18 403/108 |
| 4,357,137 A * | 11/1982 | Brown | ............... | F16D 1/06 464/150 |
| 4,667,530 A * | 5/1987 | Mettler | ............... | B62D 1/185 403/225 |
| 4,795,403 A * | 1/1989 | Heine | ............... | B60K 17/22 464/160 |
| 4,828,423 A * | 5/1989 | Cramer, Jr. | ............... | F16D 1/0835 403/326 |
| 6,041,885 A * | 3/2000 | Watanabe | ............... | B62D 3/12 180/444 |
| 6,149,526 A * | 11/2000 | Boersma | ............... | B62D 1/185 403/225 |
| 6,755,746 B2 * | 6/2004 | Barnley | ............... | F16D 1/08 403/359.5 |
| 6,848,534 B2 * | 2/2005 | Toyofuku | ............... | B62D 5/0427 180/443 |
| 7,014,009 B2 * | 3/2006 | Yamamoto | ............... | B62D 5/043 180/444 |
| 7,308,876 B2 * | 12/2007 | Schafer | ............... | F01L 1/022 123/90.15 |
| 8,337,350 B2 * | 12/2012 | Kakinami | ............... | B60K 6/26 475/5 |
| 2005/0077101 A1 * | 4/2005 | Yamamoto | ............... | B62D 5/043 180/444 |
| 2006/0201462 A1 * | 9/2006 | Schafer | ............... | F01L 1/022 123/90.17 |
| 2007/0105632 A1 * | 5/2007 | Brissette | ............... | F16D 1/0835 464/51 |
| 2008/0028591 A1 * | 2/2008 | Hughes | ............... | F16D 1/0817 29/436 |
| 2011/0271512 A1 * | 11/2011 | Hughes | ............... | F16D 1/0817 29/450 |
| 2013/0105267 A1 * | 5/2013 | Nakamura | ............... | F16D 1/0835 192/56.1 |
| 2013/0324345 A1 * | 12/2013 | Asakura | ............... | B62D 5/008 475/198 |
| 2014/0342872 A1 * | 11/2014 | Imai | ............... | B60K 6/26 477/5 |
| 2015/0001025 A1 * | 1/2015 | Slayne | ............... | F16D 7/021 192/56.1 |
| 2015/0308511 A1 * | 10/2015 | Asakura | ............... | B62D 5/008 464/30 |
| 2016/0230866 A1 * | 8/2016 | Lingren | ............... | F16D 7/021 |
| 2017/0067512 A1 * | 3/2017 | Nakawatari | ............... | F16D 1/02 |

FOREIGN PATENT DOCUMENTS

| | | |
|---|---|---|
| JP | 2002-147480 A | 5/2002 |
| JP | 2002-308119 A | 10/2002 |
| JP | 2003-139154 A | 5/2003 |
| JP | 2011-052715 A | 3/2011 |
| JP | 2011-214646 A | 10/2011 |
| JP | 2011-526669 A | 10/2011 |
| JP | 2012-052638 A | 3/2012 |
| JP | 2015-155292 A | 8/2015 |
| WO | 2010-001221 A1 | 1/2010 |
| WO | 2013/0803211 A1 | 6/2013 |

* cited by examiner

|  | ENGAGEMENT DEVICE | | | | | |
|---|---|---|---|---|---|---|
|  | C1 | C2 | B0 | B1 | B2 | F1 |
| 1st | ○ |  |  |  | (○) | ○ |
| 2nd | ○ |  |  | ○ |  |  |
| 3rd | ○ | ○ |  |  |  |  |
| 4th |  | ○ |  | ○ |  |  |
| Rev | ○ |  |  |  | ○ |  |
| DOUBLE-DRIVE |  |  | ○ |  |  |  |

○ ENGAGED

POWER TRANSMISSION SYSTEM FOR VEHICLE

INCORPORATION BY REFERENCE

The disclosure of Japanese Patent Application No. 2015-241633 filed on Dec. 10, 2015 including the specification, drawings and abstract is incorporated herein by reference in its entirety.

BACKGROUND

1. Technical Field

The disclosure relates to a power transmission system provided in a vehicle and, more particularly, to a reduction of tooth hammer noise that occurs due to looseness in a power transmission path.

2. Description of Related Art

In looseness between rotary shafts that constitute a power transmission system provided in a vehicle, there is known that tooth hammer noise occurs as a result of a collision of teeth in the looseness, and measures for a reduction of the tooth hammer noise have been suggested. For example, in a power transmission system described in International Application Publication No. 2013/080311, a rotor shaft of a second electric motor constitutes part of a power transmission path from an engine to drive wheels. Therefore, the direct torque of the engine is transmitted to the rotor shaft. For this reason, even when the torque of the second electric motor is close to zero, the spline teeth of the rotor shaft are pressed against the spline teeth of the other rotary shaft while the engine is being driven. Thus, the looseness between the spline teeth of the rotor shaft and the spline teeth of the other rotary shaft is filled, and occurrence of tooth hammer noise is reduced.

SUMMARY

Incidentally, in the power transmission system described in International Application Publication No. 2013/080311, the looseness of the rotor shaft of the second electric motor is filled in a power transmission path between the engine and the second electric motor. However, looseness between an input shaft of a transmission, which is arranged downstream (on the drive wheel side) of the second electric motor, and the rotor shaft of the second electric motor is not filled. Therefore, as the torque that is input to the transmission becomes close to zero, there is a possibility that tooth hammer noise occurs due to the looseness between the rotor shaft of the second electric motor and the input shaft of the transmission. International Application Publication No 2013/080311 describes a hybrid-type power transmission system; however, a similar problem as in the case of International Application Publication No. 2013/080311 occurs as long as looseness is formed between the rotary shafts.

The disclosure provides a structure that is able to reduce tooth hammer noise that occurs due to clearance between the rotary shafts that constitute a power transmission system.

An aspect of the disclosure provides a power transmission system for a vehicle. The power transmission system includes a first rotary shaft, a second rotary shaft, a fitting portion, a tolerance ring, and a spigot joint portion. The first rotary shaft and the second rotary shaft arranged around a common axis. The fitting portion at which the first rotary shaft and the second rotary shaft are fitted and coupled to each other so as to transmit power. The tolerance ring is arranged near the fitting portion in a direction of the axis between the first rotary shaft and the second rotary shaft. The second rotary shaft has an inner peripheral spigot joint surface, the tolerance ring being provided between the fitting portion and the inner peripheral spigot joint surface. The first rotary shaft has a first outer peripheral spigot joint surface, the first outer peripheral spigot joint surface being provided so as to be fitted to the inner peripheral spigot joint surface. The spigot joint portion provided such that the first outer peripheral spigot joint surface and the inner peripheral spigot joint surface do not rattle with respect to each other when the inner peripheral spigot joint surface and the first outer peripheral spigot joint surface are fitted to each other.

With the power transmission system for a vehicle according to the disclosure, the tolerance ring is arranged between the first rotary shaft and the second rotary shaft. For this reason, even when looseness in the fitting portion of the first rotary shaft and second rotary shaft is not filled, both the first rotary shaft and the second rotary shaft are held by the tolerance ring without rattling. Therefore, it is possible to reduce tooth hammer noise that occurs in the fitting portion.

The tolerance ring is arranged at a position at which the tolerance ring is placed between the fitting portion and the spigot joint portion in the direction of the axis, and the first rotary shaft and the second rotary shaft are held by these fitting portion and spigot joint portion. For this reason, decentering at the time when the first rotary shaft and the second rotary shaft are driven reduces, so it is possible to reduce a decentering load that acts on the tolerance ring while the rotary shafts are being driven.

In the power transmission system for a vehicle, the first rotary shaft may have a second outer peripheral spigot joint surface, the second outer peripheral spigot joint surface provided between the fitting portion and the tolerance ring in the direction of the axis of the first rotary shaft so as to be fitted to the inner peripheral spigot joint surface, dimensions of the inner peripheral spigot joint surface and dimensions of the second outer peripheral spigot joint surface may be set such that, the inner peripheral spigot joint surface and the second outer peripheral spigot joint surface do not rattle with respect to each other when the inner peripheral spigot joint surface and the second outer peripheral spigot joint surface are fitted to each other.

With the power transmission system for a vehicle according to the disclosure, in a state where the tolerance ring is assembled to one of the first rotary shaft and the second rotary shaft, the tolerance ring is fitted to the other one of the first rotary shaft and the second rotary shaft. Since the second outer peripheral spigot joint surface is provided between the fitting portion and the tolerance ring, the inner peripheral spigot joint surface and the second outer peripheral spigot joint surface are fitted to each other before the tolerance ring contacts the other one of the first rotary shaft and the second rotary shaft. The dimensions of the inner peripheral spigot joint surface and the dimensions of the second outer peripheral spigot joint surface are set such that the inner peripheral spigot joint surface and the second outer peripheral spigot joint surface do not rattle. For this reason, as the inner peripheral spigot joint surface and the first outer peripheral spigot joint surface are fitted to each other, the axes of the first rotary shaft and second rotary shaft are aligned. That is, misalignment of the axes of the first rotary shaft and second rotary shaft is prevented during assembling, and the tolerance ring contacts the other one of the first rotary shaft and the second rotary shaft in this state. For this reason, it is possible to reduce a load that acts at the time when the tolerance ring contacts the other one of the first rotary shaft and the second rotary shaft.

In the power transmission system for a vehicle, the tolerance ring may be accommodated in an annular groove arranged on an outer periphery of the first rotary shaft, and the tolerance ring may have outward-directed protrusions that contact the second rotary shaft.

With the power transmission system for a vehicle according to the disclosure, the outward-directed protrusions of the tolerance ring contact the second rotary shaft, so it is possible to hold the first rotary shaft and the second rotary shaft without rattling.

In the power transmission system for a vehicle, the tolerance ring may be accommodated in an annular groove arranged on an inner periphery of the second rotary shaft, and the tolerance ring may have inward-directed protrusions that contact the first rotary shaft.

With the power transmission system for a vehicle according to the disclosure, the inward-directed protrusions of the tolerance ring contact the first rotary shaft, so it is possible to hold the first rotary shaft and the second rotary shaft without rattling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described in detail with reference to the accompanying drawings. In the following embodiment, the drawings are simplified or modified where appropriate, and the scale ratio, shape, and the like, of each portion are not always accurately drawn.

Figure 1:
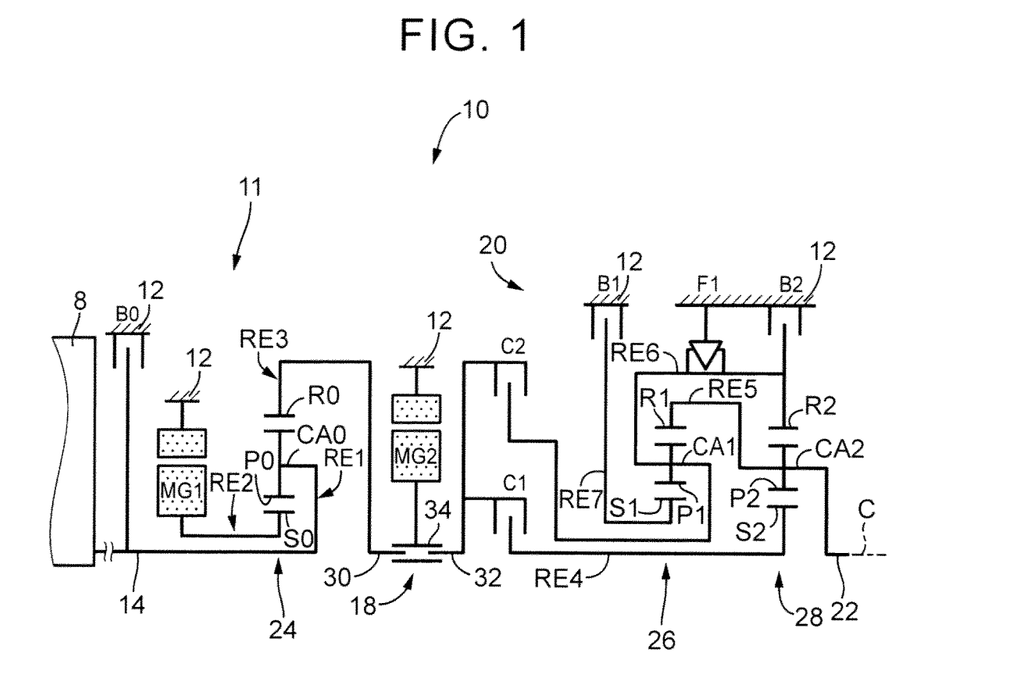
FIG. 1 is a skeletal view that illustrates a power transmission system for a hybrid vehicle to which the disclosure is applied.

FIG. 1 is a skeletal view that illustrates a power transmission system 10 for a hybrid vehicle to which the disclosure is applied. As shown in FIG. 1, the power transmission system 10 includes an input shaft 14, a differential unit 11 (electrical differential unit), an automatic transmission 20 and an output shaft 22 inside a transmission case 12 (hereinafter, referred to as case 12) in series along the common axis C. The case 12 serves as a non-rotating member and is connected to a vehicle body. The input shaft 14 serves as an input rotating member. The differential unit 11 serves as a continuously variable transmission unit coupled to the input shaft 14 directly or indirectly via a pulsation absorbing damper (vibration damping device) (not shown), or the like. The automatic transmission 20 is serially coupled via a transmission member 18 in a power transmission path from the differential unit 11 to a drive wheel (not shown). The output shaft 22 serves as an output rotating member and is coupled to the automatic transmission 20. The power transmission system 10 is, for example, suitably used in a front-engine rear-drive (FR) vehicle in which the power transmission system 10 is longitudinally arranged. The power transmission system 10 is provided between an engine 8 and the drive wheel. The engine 8 is an internal combustion engine, such as a gasoline engine and a diesel engine, as a power source for propelling the vehicle, and is directly coupled to the input shaft 14 or directly coupled to the input shaft 14 via the pulsation absorbing damper (not shown). Power from the engine 8 is transmitted to the drive wheel sequentially via a differential gear unit (final reduction gear), an axle, and the like (not shown), that constitute part of the power transmission path.

In this way, in the power transmission system 10 according to the present embodiment, the engine 8 and the differential unit 11 are directly coupled to each other. This direct coupling means coupling without intervening a fluid transmission device, such as a torque converter and a fluid coupling. For example, coupling via the pulsation absorbing damper, or the like, is included in this direct coupling.

The differential unit 11 is coupled to the power transmission path between the engine 8 and the drive wheel. The differential unit 11 includes a first electric motor MG1, a differential planetary gear device 24, a second electric motor MG2 and a fixed brake B0. The first electric motor MG1 functions as a differential electric motor that controls a differential state between the input shaft 14 and the transmission member 18 (output shaft). The differential planetary gear device 24 is a mechanical mechanism that mechanically distributes the output power of the engine 8, input to the input shaft 14, and serves as a differential mechanism that distributes the output power of the engine 8 between the first electric motor MG1 and the transmission member 18. The second electric motor MG2 is operably coupled to the transmission member 18 that functions as the output shaft so as to integrally rotate with the transmission member 18. The fixed brake B0 is used to stop the rotation of the input shaft 14. Each of the first electric motor MG1 and the second electric motor MG2 according to the present embodiment is a so-called motor generator that also has a power generation function. The first electric motor MG1 has at least a generator (power generation) function for generating reaction force. The second electric motor MG2 has at least a motor (electric motor) function for functioning as a drive electric motor that outputs driving force as a driving force source for propelling the vehicle.

The differential planetary gear device 24 that functions as the differential mechanism is mainly formed of the single pinion differential planetary gear device 24 having a predetermined gear ratio. The differential planetary gear device 24 includes a differential sun gear S0 differential planetary gears P0, a differential carrier CA0 and a differential ring gear R0 as rotating elements. The differential carrier CA0 supports the differential planetary gears P0 such that each differential planetary gear P0 is rotatable and revolvable. The differential ring gear R0 is in mesh with the differential sun gear S0 via the differential planetary gears P0.

In this differential planetary gear device 24, the differential carrier CA0 is coupled to the input shaft 14, that is, the engine 8, and constitutes a first rotating element RE1, the differential sun gear S0 is coupled to the first electric motor MG1 and constitutes a second rotating element RE, and the differential ring gear R0 is coupled to the transmission member 18 and constitutes a third rotating element RE3. The thus configured differential planetary gear device 24 is able to activate differential action by allowing the differential sun gear S0, the differential carrier CA0 and the differential ring gear R0 that are the three elements of the differential planetary gear device 24 to relatively rotate with respect to each other. That is, the differential planetary gear device 24 is placed in a differential state where differential action works. Thus, the output power of the engine 8 is distributed between the first electric motor MG1 and the transmission member 18, and electric energy generated from the first electric motor MG1 by using part of the distributed output power of the engine 8 is stored or the second electric motor MG2 is driven to rotate by using part of the distributed output power of the engine 8. Therefore, the differential unit 11 functions as an electrical differential device. For example, the differential unit 11 is placed in a so-called continuously variable shift state, and the rotation of the transmission member 18 is continuously varied irrespective of predetermined rotation of the engine 8. That is, the differential unit 11 functions as an electrical continuously variable transmission of which the speed ratio (Rotation speed Nin of the input shaft 14/Rotation speed N18 of the transmission member 18) is continuously varied from a minimum value γ0min to a maximum value γ0max.

The automatic transmission 20 constitutes part of the power transmission path between the engine 8 and the drive wheel. The automatic transmission 20 is a planetary gear multi-stage transmission that includes a single pinion first planetary gear device 26 and a single pinion second planetary gear device 28 and that functions as a stepped automatic transmission. The first planetary gear device 26 includes a first sun gear S1, first planetary gears P1, a first carrier CA1 and a first ring gear R1, and has a predetermined gear ratio. The first carrier CA1 supports the first planetary gears P1 such that each first planetary gear P1 is rotatable and revolvable. The first ring gear R1 is in mesh with the first sun gear S1 via the first planetary gears P1. The second planetary gear device 28 includes a second sun gear S2, second planetary gears P2, a second carrier CA2 and a second ring gear R2, and has a predetermined gear ratio. The second carrier CA2 supports the second planetary gears P2 such that each second planetary gear P2 is rotatable and revolvable. The second ring gear R2 is in mesh with the second sun gear S2 via the second planetary gears P2.

In the automatic transmission 20, the first sun gear S1 is selectively coupled to the case 12 via a first brake B1. The first carrier CA1 and the second ring gear R2 are integrally coupled to each other and are coupled to the transmission member 18 via a second clutch C2, and are selectively coupled to the case 12 via a second brake B2. The first ring gear R1 and the second carrier CA2 are integrally coupled to each other and are coupled to the output shaft 22. The second sun gear S2 is selectively coupled to the transmission member 18 via a first clutch C1. The first carrier CA1 and the second ring gear R2 are coupled to the case 12, which is a non-rotating member, via a one-way clutch F1. The first carrier CA1 and the second ring gear R2 are permitted to rotate in the same direction as the engine 8, and prohibited from rotating in the reverse direction. Thus, the first carrier CA1 and the second ring gear R2 function as rotating members that are not rotatable in the reverse direction.

Figure 2:
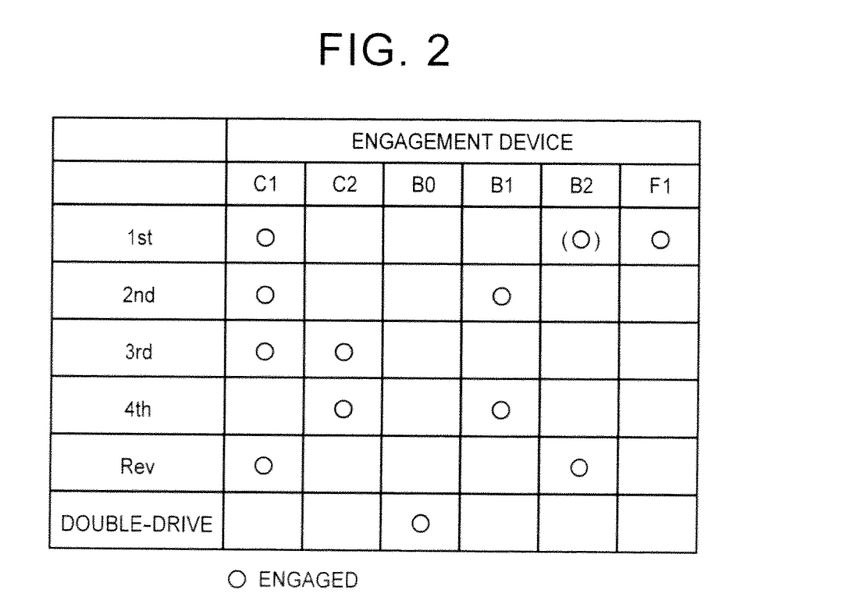
FIG. 2 is an engagement operation chart of an automatics mission shown in FIG.

The automatic transmission 20 selectively establishes a plurality of speed positions as a result of a clutch-to-clutch shift by releasing a release-side engagement device and engaging an engage-side engagement device. Thus, the speed ratio γ(=Rotation speed N18 of the transmission member 18/Rotation speed Nout of the output shaft 22) that substantially geometrically varies is obtained for each speed position. For example, as shown in the engagement operation chart of FIG. 2, a first speed position 1st is established when the first clutch C1 and the one-way clutch F are engaged. A second speed position 2nd is established when the first clutch C1 and the first brake B1 are engaged. A third speed position 3rd is established when the first clutch C1 and the second clutch C2 are engaged. A fourth speed position 4th is established when the second clutch C2 and the first brake B1 are engaged. A reverse speed position Rev is established when the first clutch C1 and the second brake B2 are engaged.

In driving the vehicle with the use of the first electric motor MG1 and the second electric motor MG2, the fixed brake B0 is engaged. When the fixed brake B0 is engaged, the input shaft 14 coupled to the engine 8 is caused to stop rotation, with the result that the reaction torque of the first electric motor MG1 is output from the transmission member 18. Therefore, it is possible to drive the vehicle with the use of the first electric motor MG1 in addition to the second electric motor MG2. At this time, the automatic transmission 20 establishes any one of the first speed position 1st to the fourth speed position 4th. The automatic transmission 20 is placed in a neutral "N" state when the first clutch C1, the second clutch C2, the first brake B1 and the second brake B2 are released. At the time of engine brake in the first speed position 1st, the second brake B2 is engaged.

Figure 3:
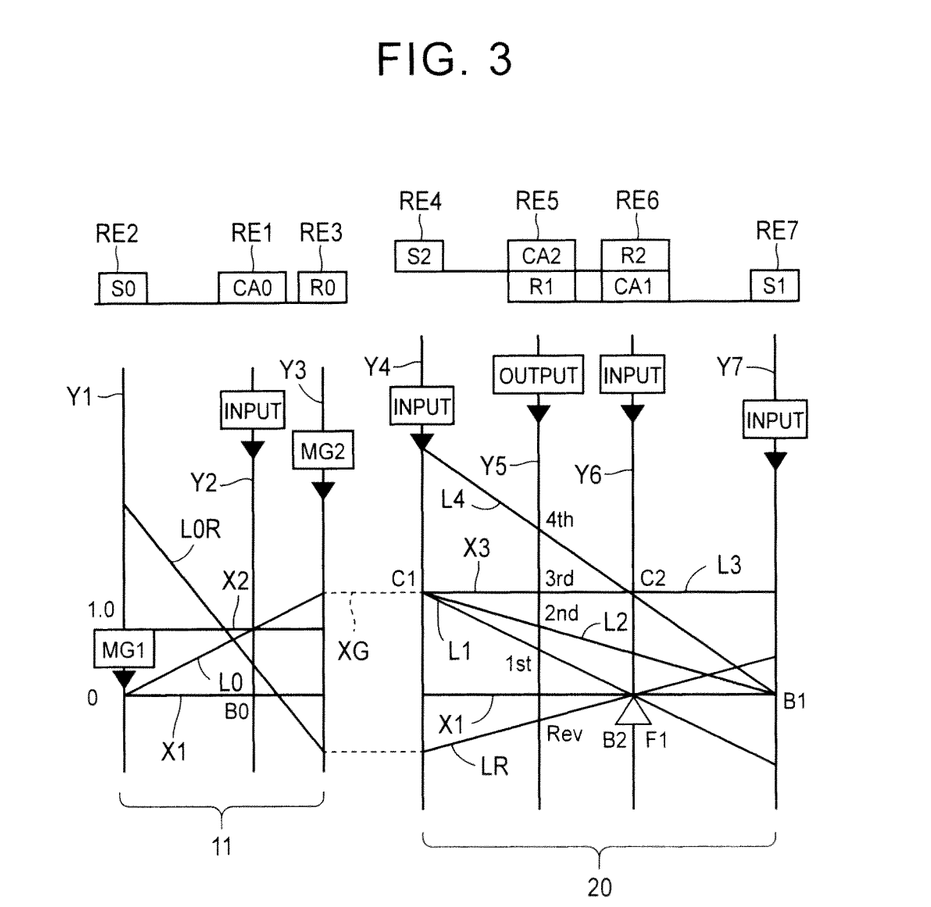
FIG. 3 is a nomograph that shows the relative relationship on straight lines among rotation speeds of rotating elements of which coupled states vary among speed positions in the automatic transmission shown in FIG. 1.

FIG. 3 is a nomograph that shows the relative relationship on straight lines among the rotation speeds of the rotating elements of which coupled states vary among the speed positions in the power transmission system 10 including the differential unit 11 and the automatic transmission 20. The nomograph of FIG. 3 is a two-dimensional coordinate system consisting of an abscissa axis that represents the relationship in gear ratio among the planetary gear devices 24, 26, 28 and an ordinate axis that represents a relative rotation speed. Among three horizontal lines, the bottom horizontal line X1 indicates a rotation speed of zero, the top horizontal line X2 indicates a rotation speed of 1.0, that is, the rotation speed Ne of the engine 8 coupled to the input shaft 14, and the horizontal line X3 indicates the rotation speed of the third rotating element RE3 (described later), which is input from the differential unit 11 to the automatic transmission 20.

Three vertical lines Y1, Y2, Y3 corresponding to the three elements of the differential planetary gear device 24 that constitutes the differential unit 11 respectively indicate the relative rotation speed of the differential sun gear S0 corresponding to the second rotating element RE2, the relative rotation speed of the differential carrier CA0 corresponding to the first rotating element RE1 and the relative rotation speed of the differential ring gear R0 corresponding to the third rotating element RE3 in order from the left side. The intervals between these vertical lines are determined on the basis of the gear ratio of the differential planetary gear device 24.

Four vertical lines Y4, Y5, Y6, Y7 for the automatic transmission 20 respectively indicate the relative rotation speed of the second sun gear S2 corresponding to a fourth rotating element RE4, the relative rotation speed of the mutually coupled first ring gear R1 and second carrier CA2 corresponding to a fifth rotating element RE5, the mutually coupled first carrier CA1 and second ring gear R2 corresponding to a sixth rotating element RE6 and the relative rotation speed of the first sun gear S1 corresponding to a seventh rotating element RE7 in order from the left side. The intervals between those rotating elements are determined on the basis of the gear ratios of the first and second planetary gear devices 26, 28.

As expressed by using the nomograph of FIG. 3, the power transmission system 10 according to the present embodiment is configured as follows. The first rotating element RE1 (differential carrier CA0) of the differential planetary gear device 24 is coupled to the input shaft 14, that is, the engine 8, the second rotating element RE2 (differential sun gear S0) is coupled to the first electric motor MG1, the third rotating element RE3 (differential ring gear R0) is coupled to the transmission member 18 and the second electric motor MG2. The rotation of the input shaft 14 is transmitted to the automatic transmission 20 via the differential planetary gear device 24 and the transmission member 18. At this time, an oblique straight line L0 passing through the intersection point of Y2 and X2 indicates the relationship between the rotation speed of the differential sun gear S0 and the rotation speed of the differential ring gear R0.

For example, in the differential unit 11, the first rotating element RE1 to the third rotating element RE3 are placed in a differential state where the first rotating element RE1 to the third rotating element RE3 are relatively rotatable with respect to each other. When the rotation speed of the differential ring gear R0 is constrained by the vehicle speed V and is substantially constant, as the rotation of the differential sun gear S0 is increased or decreased by controlling the rotation speed of the first electric motor MG1, the rotation speed of the differential carrier CA0, that is, the engine rotation speed Ne, is increased or decreased. The rotation speed of the differential ring gear R0 is indicated by the intersection point of the straight line L0 and the vertical line Y3, the rotation speed of the differential sun gear S0 is indicated by the intersection point of the straight line L0 and the vertical line Y1, and the rotation speed of the differential carrier CA0 is indicated by the intersection point of the straight line L0 and the vertical line Y2.

When the rotation of the differential sun gear S0 is brought to the same rotation as the engine rotation speed Ne by controlling the rotation speed of the first electric motor MG1 such that the speed ratio of the differential unit 11 is fixed to "1.0", the straight line L0 coincides with the horizontal line X2. The differential ring gear R0, that is, the transmission member 18, is rotated at the same rotation as the engine rotation speed Ne. Alternatively, when the rotation of the differential sun gear S0 is set to zero by controlling the rotation speed of the first electric motor MG1 such that the speed ratio of the differential unit 11 is fixed to a value smaller than "1.0", for example, about 0.7, the straight line L0 is in the state shown in FIG. 3. The transmission member 18 is rotated at an increased speed higher than the engine rotation speed Ne. For example, by rotating the second electric motor MG2 in the reverse direction, the rotation speed N18 of the transmission member 18 coupled to the differential ring gear R0 is rotated at a rotation speed lower than zero as indicated by the straight line L0R.

In the automatic transmission 20, the fourth rotating element RE4 is selectively coupled to the transmission member 18 via the first clutch C1, and the fifth rotating element RE5 is coupled to the output shaft 22. The sixth rotating element RE6 is selectively coupled to the transmission member 18 via the second clutch C2, and is selectively coupled to the case 12 via the second brake B2. The seventh rotating element RE7 is selectively coupled to the case 12 via the first brake B1.

In the automatic transmission 20, for example, when the rotation speed of the differential sun gear S0 is set to substantially zero by controlling the rotation speed of the first electric motor MG1 in the differential unit 11, the straight line L0 is in a state shown in FIG. 3. Rotation at an increased speed higher than the engine rotation speed Ne is output to the third rotating element RE3. As shown in FIG. 3, when the first clutch C1 and the second brake B2 are engaged, the rotation speed of the output shaft 22 of the first speed position 1st is indicated by the intersection point of the oblique straight line L1 and the vertical line Y5. The straight line L1 is a straight line that passes through the intersection point of the horizontal line X3 and the vertical line Y4, which indicates the rotation speed of the fourth rotating element RE4, and the intersection point of the horizontal line X1 and the vertical line Y6, which indicates the rotation speed of the sixth rotating element RE6. The vertical line Y5 is a straight line that indicates the rotation speed of the fifth rotating element RE5 coupled to the output shaft 22.

Similarly, the rotation speed of the output shaft 22 in the second speed position 2nd is indicated by the intersection point of the oblique straight line L2 that is determined when the first clutch C1 and the first brake B1 are engaged and the vertical line Y5 indicating the rotation speed of the fifth rotating element RE5 coupled to the output shaft 22. The rotation speed of the output shaft 22 in the third speed position 3rd is indicated by the intersection point of the horizontal straight line L3 that is determined when the first clutch C1 and the second clutch C2 are engaged and the vertical line Y5 indicating the rotation speed of the fifth rotating element RE5 coupled to the output shaft 22. The rotation speed of the output shaft 22 in the fourth speed position 4th is indicated by the intersection point of the oblique straight line L4 that is determined when the second clutch C2 and the first brake B1 are engaged and the vertical line Y5 indicating the rotation speed of the fifth rotating element RE5 coupled to the output shaft 22. The second electric motor MG2 is rotated in the reverse direction, and the rotation speed of the output shaft 22 in the reverse speed position Rev is indicated by the intersection point of the oblique straight line LR and the vertical line Y5. The straight line LR is determined when the first clutch C1 and the second brake B2 are engaged. The vertical line Y5 indicates the rotation speed of the fifth rotating element RE5 coupled to the output shaft 22.

Figure 4:
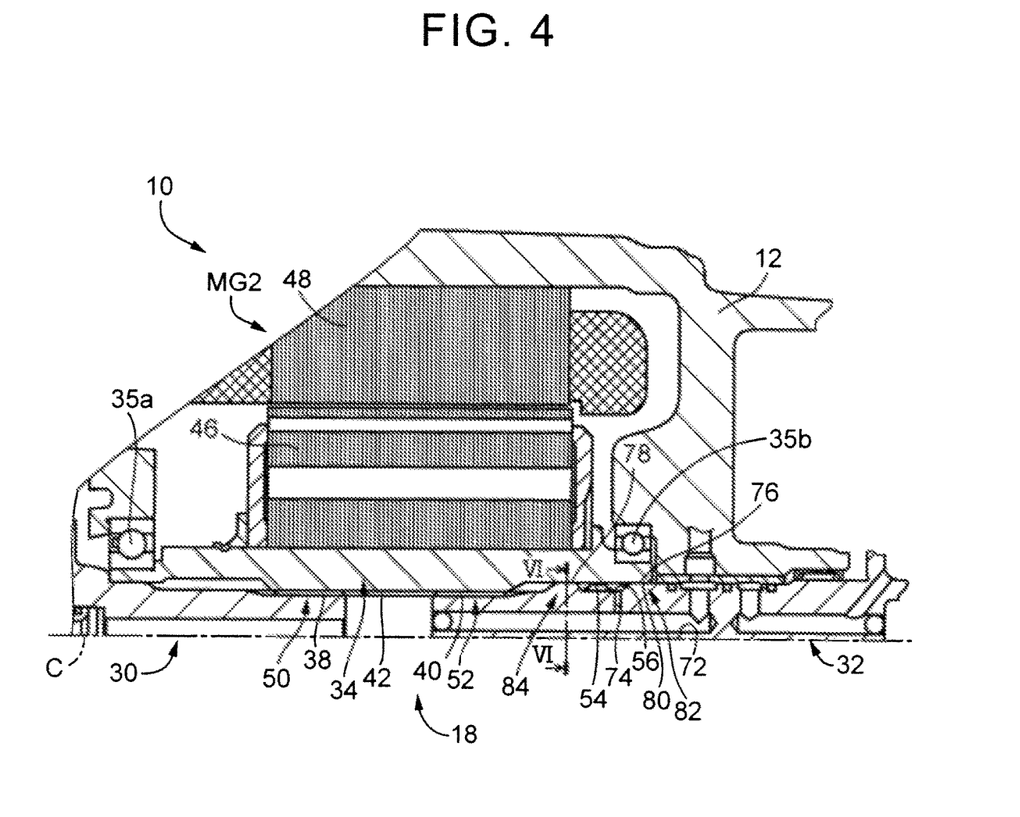
FIG. 4 is a cross-sectional view that shows part of the power transmission system shown in FIG. 1.

FIG. 4 is a cross-sectional view that shows part of the power transmission system 10. In the power transmission system 10 shown in FIG. 4, the cross-sectional view of the transmission member 18 that functions as the output shaft of the differential unit 11 and the cross-sectional view of the second electric motor MG2 coupled to the transmission member 18 are mainly shown. The transmission member 18 includes an input-side rotary shaft 30, an output-side rotary shaft 32 and a rotor shaft 34 of the second electric motor MG2. The input-side rotary shaft 30 is coupled to the differential ring gear R0 of the differential planetary gear device 24. The output-side rotary shaft 32 also functions as the input shaft of the automatic transmission 20. These input-side rotary shaft 30, output-side rotary shaft 32 and rotor shaft 34 are arranged around the common axis C. The output-side rotary shaft 32 corresponds to a first rotary shaft according to the disclosure, and the rotor shaft 34 corresponds to a second rotary shaft according to the disclosure.

The input-side rotary shaft 30 and the output-side rotary shaft 32 are arranged at positions spaced apart from each other in the direction of the axis C when viewed from the radially outer side, and the rotor shaft 34 of the second electric motor MG2 couples these input-side rotary shaft 30 and output-side rotary shaft 32 to each other.

The rotor shaft 34 of the second electric motor MG2 has a cylindrical shape, and is arranged so as to cover the ends (distal ends) of the outer peripheries of the input-side rotary shaft 30 and output-side rotary shaft 32 facing each other in the direction of the axis C. The rotor shaft 34 is rotatably supported by the case 12 via bearings 35a, 35b respectively arranged at both ends of the outer periphery of the rotor shaft 34 in the direction of the axis C.

The input-side rotary shaft 30 has outer peripheral teeth 38 on its outer periphery at the side facing the output-side rotary shaft 32 in the direction of the axis C. The output-side rotary shaft 32 has outer peripheral teeth 40 having the same shape as the outer peripheral teeth 38 of the input-side rotary shaft 30 on its outer periphery at the side facing the input-side rotary shaft 30 in the direction of the axis C. The cylindrical rotor shaft 34 of the second electric motor MG2 has inner peripheral teeth 42 on its inner peripheral side. The inner peripheral teeth 42 are spline-fitted to the outer peripheral teeth 38 and the outer peripheral teeth 40. The outer peripheral teeth 38 of the input-side rotary shaft 30 and the inner peripheral teeth 42 of the rotor shaft 34 are spline-fitted to each other, and the outer peripheral teeth 40 of the output-side rotary shaft 32 and the inner peripheral teeth 42 of the rotor shaft 34 are spline-fitted to each other. When the outer peripheral teeth 38 of the input-side rotary shaft 30 and the inner peripheral teeth 42 of the rotor shaft 34 are spline-fitted to each other, a spline fitting portion 50 is provided. At the spline fitting portion 50, the input-side rotary shaft 30 and the rotor shaft 34 are coupled to each other such that power is transmittable. In the spline fitting portion 50, looseness is formed between the outer peripheral teeth 38 and the inner peripheral teeth 42, and relative rotation between the input-side rotary shaft 30 and the rotor shaft 34 is permitted within the looseness. When the outer peripheral teeth 40 of the output-side rotary shaft 32 and the inner peripheral teeth 42 of the rotor shaft 34 are spline-fitted to each other, a spline fitting portion 52 is provided. At the spline fitting portion 52, the output-side rotary shaft 32 and the rotor shaft 34 are coupled to each other such that power is transmittable. In the spline fitting portion 52, looseness is formed between the outer peripheral teeth 40 and the inner peripheral teeth 42, and relative rotation between the output-side rotary shaft 32 and the rotor shaft 34 is permitted within the looseness. The spline fitting portion 52 corresponds to a fitting portion according to the disclosure.

A rotor 46 that constitutes the second electric motor MG2 is fixed to the outer periphery of the rotor shaft 34, and a stator 48 that constitutes the second electric motor MG2 is arranged on the outer peripheral side of the rotor 46. The rotor 46 is formed of a plurality of laminated steel sheets.

Similarly, the stator 48 is also formed of a plurality of laminated steel sheets, and is non-rotatably fixed to the case 12 by bolts (not shown).

In the thus configured power transmission system 10, as the torque of the engine 8 is transmitted to the input-side rotary shaft 30, torque is transmitted to the rotor shaft 34 via the spline fitting portion 50 between the input-side rotary shaft 30 and the rotor shaft 34. Torque is transmitted to the output-side rotary shaft 32 via the spline fitting portion 52 of the rotor shaft 34 and output-side rotary shaft 32. Therefore, even in a state where no torque is output from the second electric motor MG2, looseness in the spline fitting portion 50 of the input-side rotary shaft 30 and rotor shaft 34 is filled.

Incidentally, when torque that is input to the automatic transmission 20 is zero, looseness that is formed between the rotor shaft 34 and the output-side rotary shaft 32 is not filled, so there is a possibility that tooth hammer noise occurs due to the looseness. In order to eliminate this inconvenience, in the present embodiment, a tolerance ring 54 is interposed between the rotor shaft 34 and the output-side rotary shaft 32 near the spline fitting portion 52 in the direction of the axis C.

Figure 5:
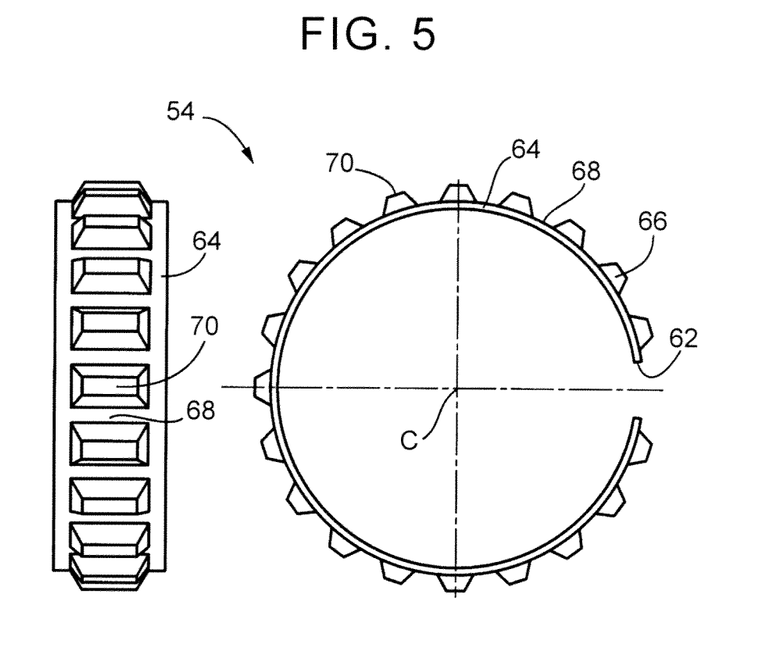
FIG. 5 is a view that shows the shape of a tolerance ring shown in FIG. 4.

The output-side rotary shaft 3 has an annular groove 56 on its outer periphery. The tolerance ring 54 is accommodated in an annular space defined by the annular groove 56. FIG. 5 shows the shape of the tolerance ring 54.

The tolerance ring 54 shown in FIG. 5 is made of a metal elastic material, and is formed in a substantially annular shape with a cutout 62 at part of the tolerance ring 54 in the circumferential direction. The tolerance ring 54 includes a substantially annular 5, base 64 and a plurality of outward-directed protrusions 66 protruding radially outward from the base 64. Since the cutout 62 is partially formed in the circumferential direction, the base 64 is allowed to be elastically deformed, so the tolerance ring 54 is allowed to be fitted to the output-side rotary shaft 32 in advance. The outward-directed protrusions 66 are arranged substantially at the center in the width direction of the base 64 (the horizontal direction in FIG. 5), and are caused to contact the rotor shaft 34 after assembling. The outward-directed protrusions 66 are arranged at equal intervals in the circumferential direction, and a flat face 68 is formed between any adjacent outward-directed protrusions 66 in the circumferential direction. Each of the outward-directed protrusions 66 has a trapezoidal shape when viewed in the direction of the axis C, and has a contact face 70 at the radially outer side. The contact face 70 contacts the inner periphery of the rotor shaft 34 after assembling. The hardness of the tolerance ring 54 is set to a value lower than the hardness of the outer peripheral surface of the output-side rotary shaft 32 and the hardness of the inner peripheral surface of the rotor shaft 34.

Referring back to FIG. 4, the output-side rotary shaft 32 has an oil passage 72 parallel to the axis C and a radial oil passage 74 that communicates the oil passage 72 with the annular groove 56. Lubricating oil is supplied from a hydraulic control circuit (not shown) to the tolerance ring 54 arranged in the annular groove 56 via the oil passage 72 and the oil passage 74. Lubricating oil lubricates the tolerance ring 54, washes abrasion powder caused by abrasion of the tolerance ring 54, or cools sliding faces of the tolerance ring 54 and output-side rotary shaft 32. The tolerance ring 54 is designed such that a slip occurs between the inner periphery of the tolerance ring 54 and the annular groove 56 of the output-side rotary shaft 32.

The output-side rotary shaft 32 has a first outer peripheral spigot joint surface 76 at a position away from the annular groove 56 in which the tolerance ring 54 is accommodated in the direction of the axis C with reference to the outer peripheral teeth 40. That is, the output-side rotary shaft 32 has the first outer peripheral spigot joint surface 76 at a position across the annular groove 56 from the outer peripheral teeth 40 in the direction of the axis C. The output-side rotary shaft 32 has a second outer peripheral spigot joint surface 78 between the outer peripheral teeth 40 and the annular groove 56 in the direction of the axis C. Thus, the annular groove 56 in which the tolerance ring 54 is accommodated is provided between the first outer peripheral spigot joint surface 76 and the second outer peripheral spigot joint surface 78 in the direction of the axis C. The first outer peripheral spigot joint surface 76 corresponds to an outer peripheral spigot joint surface according to the disclosure, and the second outer peripheral spigot joint surface 78 corresponds to a second outer peripheral spigot joint surface according to the disclosure.

The rotor shaft 34 has an inner peripheral spigot joint surface 80 on its inner peripheral side. The inner peripheral spigot joint surface 80 is fitted to the first outer peripheral spigot joint surface 76 and the second outer peripheral spigot joint surface 78 after assembling. The inner peripheral spigot joint surface 80 has such a length that the inner peripheral spigot joint surface 80 is fittable to the first outer peripheral spigot joint surface 76 and the second outer peripheral spigot joint surface 78 in the direction of the axis C after assembling. That is, the rotor shaft 34 has the inner peripheral spigot joint surface 80 at a position away from the tolerance ring 54 in the direction of the axis C with reference to the spline fitting portion 52 after assembling, and the output-side rotary shaft 32 has the first outer peripheral spigot joint surface 76 and the second outer peripheral spigot joint surface 78 that are fitted to the inner peripheral spigot joint surface 80 after assembling.

The dimensions (dimensional tolerances) of the first outer peripheral spigot joint surface 76 and inner peripheral spigot joint surface 80 are set such that the first outer peripheral spigot joint surface 76 and the inner peripheral spigot joint surface 80 are fitted to each other without rattling although loosely fitted to each other. The dimensions (dimensional tolerances) of the second outer peripheral spigot joint surface 78 and inner peripheral spigot joint surface 80 are set such that the second outer peripheral spigot joint surface 78 and the inner peripheral spigot joint surface 80 are fitted to each other without rattling although loosely fitted to each other. In FIG. 4, the portion at which the first outer peripheral spigot joint surface 76 and the inner peripheral spigot joint surface 80 are fitted to each other is defined as a first spigot joint portion 82, and the portion at which the second outer peripheral spigot joint surface 78 and the inner peripheral spigot joint surface 80 are fitted to each other is defined as a second spigot joint portion 84. The first spigot joint portion 82 and the second spigot joint portion 84 each have the same dimensional relationship. The first spigot joint portion 82 corresponds to a spigot joint portion according to the disclosure.

Figure 6:
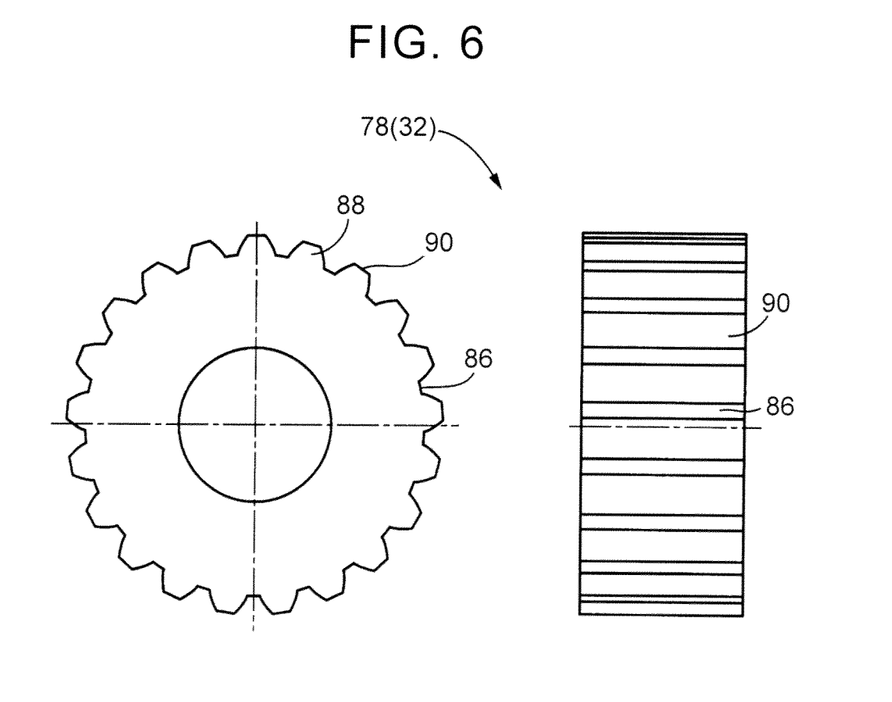
FIG. 6 is a cross-sectional view of a first spigot joint portion, taken along the line VI-VI in FIG. 4, and shows the shape of an output-side rotary shaft.

FIG. 6 is a cross-sectional view of the second spigot joint portion 84, taken along the line VI-VI in FIG. 4, and shows the shape of the output-side rotary shaft 32 at the second outer peripheral spigot joint surface 78 side. As shown in FIG. 6, when the second outer peripheral spigot joint surface 78 is viewed in the direction of the axis C, the surface is formed in splines. Specifically, a plurality of grooves 86 parallel to the axis C are formed on the second outer peripheral spigot joint surface 78 at equal intervals, so a plurality of protrusions 88 protruding radially outward are formed at equal intervals. Each of the protrusions 88 has a top face 90 on its radially outer side. The top face 90 is fitted to the inner peripheral spigot joint surface 80 of the rotor shaft 34 after assembling. Therefore, in the second spigot joint portion 84, the top faces 90 formed on the second outer peripheral spigot joint surface 78 are fitted to the inner peripheral spigot joint surface 80. Since the second outer peripheral spigot joint surface 78 has the grooves 86, lubricating oil supplied to the tolerance ring 54 via the oil passage 72 and the radial oil passage 74 lubricates the tolerance ring 54 and is then drained through the grooves 86. That is, the grooves 86 function as a drain oil passage for lubricating oil.

The tolerance ring 54 is compressed to be deformed between the output-side rotary shaft 32 and the rotor shaft 34 after assembling. Thus, pressing force for perpendicularly pressing mutual faces occurs between the contact face of the output-side rotary shaft 32 with the tolerance ring 54 and the contact face of the rotor shaft 34 with the tolerance ring 54. Since friction resistance based on this pressing force and the friction coefficient between the contact faces occurs, the rotor shaft 34 and the output-side rotary shaft 32 are held by the tolerance ring 54 without rattling with respect to each other in the circumferential direction. Thus, even in s state where looseness in the spline fitting portion 52 is not filled, the rotor shaft 34 and the output-side rotary shaft 32 are held by the tolerance ring 54 without rattling. For this reason, tooth hammer noise that occurs in the spline fitting portion 52 is reduced.

In the transition of assembling, in a state where the tolerance ring 54 is fitted to the annular groove 56 of the output-side rotary shaft 32 in advance, the output-side rotary shaft 32 is inserted into the rotor shaft 34. The tolerance ring 54 is deformed after the output-side rotary shaft 32 is inserted. For this reason, the length D1 in a state where the tolerance ring 54 is fitted to the output-side rotary shaft 32 (before insertion) is longer than the length D2 (D1>D2). The length D1 is the length from the axis C to the contact face 70 of the tolerance ring 54. The length D2 is the length from the axis C to the inner peripheral spigot joint surface 80 of the rotor shaft 34. In this context, when the tolerance ring 54 is inserted into the inner periphery (inner peripheral spigot joint surface 80) of the rotor shaft 34, the tolerance ring 54 contacts the inner peripheral spigot joint surface 80 and is compressed to be deformed. For this reason, a load that acts in a direction to interfere with insertion of the output-side rotary shaft 32 (hereinafter, press-fit load) occurs. When the output-side rotary shaft 32 is fitted into the rotor shaft 34 in a state where the tolerance ring 54 is fitted to the output-side rotary shaft 32, this press-fit load occurs from the contact face of the rotor shaft 34 with the bearing 35a as a reaction force in the thrust direction. The tip diameter of each of the outer peripheral teeth 40 of the output-side rotary shaft 32 is sufficiently smaller than the inside diameter of the inner peripheral spigot joint surface 80 of the rotor shaft 34, so no press-fit load occurs at the time when the outer peripheral teeth 40 are inserted.

When the axis of the output-side rotary shaft 32 and the axis of the rotor shaft 34 are misaligned from each other, for example, the tolerance ring 54 does not uniform deform in the transition of assembling, with the result that the press-fit load further increases. In contrast, the second outer peripheral spigot joint surface 78 of the output-side rotary shaft 32 is provided on the distal end side (outer peripheral teeth 40 side) in the direction of the axis C with respect to the position at which the tolerance ring 54 is arranged. Therefore, at the time of inserting the output-side rotary shaft 32 to the rotor shaft 34 (in the transition of assembling), the second outer peripheral spigot joint surface 78 and the inner peripheral spigot joint surface 80 are fitted to each other before the tolerance ring 54 contacts the inner peripheral spigot joint surface 80 of the rotor shaft 34. At this time, the axes of the output-side rotary shaft 32 and rotor shaft 34 are aligned, so misalignment between the axes of these rotary shafts is prevented. This also prevents an excessive increase in press-fit load that occurs at the time when the tolerance ring 54 contacts the inner peripheral spigot joint surface 80 and is compressed to be deformed.

As described above, after assembling, the first outer peripheral spigot joint surface 76 and the inner peripheral spigot joint surface 80 are fitted to each other, so the first spigot joint portion 82 is provided. The second outer peripheral spigot joint surface 78 and the inner peripheral spigot joint surface 80 are fitted to each other, so the second spigot joint portion 84 is provided. Therefore, the tolerance ring 54 is provided so as to be placed between the first spigot joint portion 82 and the second spigot joint portion 84 in the direction of the axis C. The output-side rotary shaft 32 and the rotor shaft 34 are held at two portions, that is, the first spigot joint portion 82 and the second spigot joint portion 84 that are provided on both sides of the tolerance ring 54 in the direction of the axis C. This prevents misalignment between the axes of these rotary shafts after assembling. This prevents decentering of the output-side rotary shaft 32 and the rotor shaft 34 while these rotary shafts are being driven, and reduces a decentering load that acts on the tolerance ring 54 while these rotary shafts are being driven. The decentering load corresponds to a load that radially acts on the output-side rotary shaft 32 and the rotor shaft 34 at the time when these rotary shafts decenter while being driven.

As described above, according to the present embodiment, the tolerance ring 54 is interposed between the output-side rotary shaft 32 and the rotor shaft 34. For this reason, even when looseness in the spline fitting portion 52 of the output-side rotary shaft 32 and rotor shaft 34 is not filled, both the output-side rotary shaft 32 and the rotor shaft 34 are held by the tolerance ring 54 without rattling. Therefore, it is possible to reduce tooth hammer noise that occurs in the spline fitting portion 52.

According to the present embodiment, after assembling, the tolerance ring 54 is arranged at a position between the second spigot joint portion 84 and the first spigot joint portion 82 in the direction of the axis C, and the output-side rotary shaft 32 and the rotor shaft 34 are held by these spline fitting portion 52, second spigot joint portion 84 and first spigot joint portion 82. For this reason, decentering of the output-side rotary shaft 32 and the rotor shaft 34 while these rotary shafts are being driven reduces, so it is possible to reduce a decentering load that acts on the tolerance ring 54 while these rotary shafts are being driven.

According to the present embodiment, at the time of assembling, in a state where the tolerance ring 54 is assembled to the output-side rotary shaft 32, the tolerance ring 54 is fitted into the rotor shaft 34. At this time, before the tolerance ring 54 contacts the rotor shaft 34, the inner peripheral spigot joint surface 80 and the second outer peripheral spigot joint surface 78 are fitted to each other. The dimensions of the inner peripheral spigot joint surface 80 and second outer peripheral spigot joint surface 78 are set to such an extent that the inner peripheral spigot joint surface 80 and second outer peripheral spigot joint surface 78 do not rattle. For this reason, when the inner peripheral spigot joint surface 80 and the second outer peripheral spigot joint surface 78 are fitted to each other, the axis of the output-side rotary shaft 32 and the axis of the rotor shaft 34 are aligned. That is, misalignment of the axis of the output-side rotary shaft 32 and the axis of the rotor shaft 34 is prevented. In this state, the tolerance ring 54 contacts the inner peripheral spigot joint surface 80 of the rotor shaft 34, so it is possible to reduce a load that acts at the time when the tolerance ring 54 contacts the rotor shaft 34.

According to the present embodiment, it is possible to hold the output-side rotary shaft 32 and the rotor shaft 34 without rattling by the contact of the outward-directed protrusions 66 of the tolerance ring 54 with the rotor shaft 34 after assembling.

Next, another embodiment of the disclosure will be described. In the following description, like reference numerals denote portions common to those of the above-described embodiment, and the description thereof is omitted.

Figure 7:
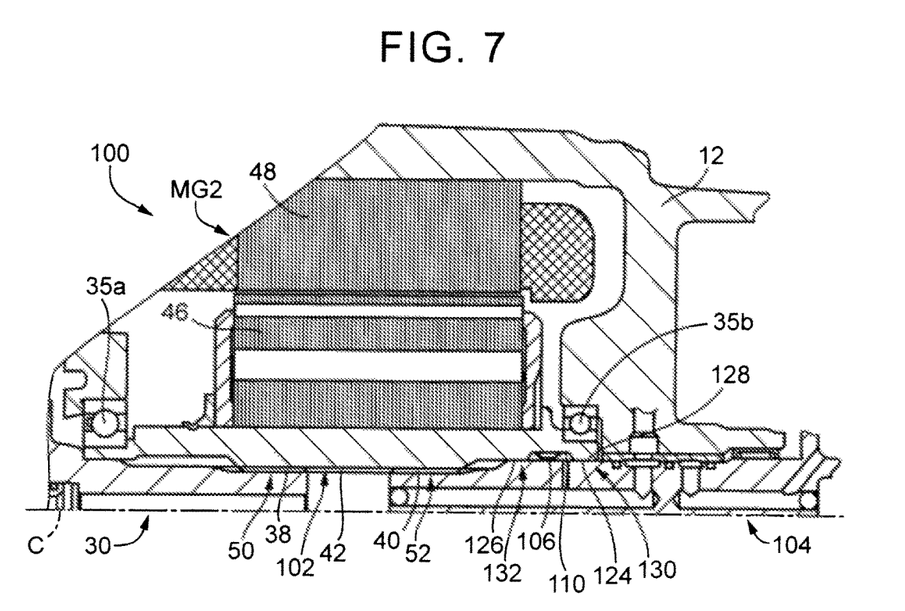
FIG. 7 is a cross-sectional view that shows part of a power transmission system according to another embodiment of the disclosure.

FIG. 7 is a cross-sectional view that shows part of a power transmission system 100 according to another embodiment of the disclosure. The power transmission system 100 according to the present embodiment differs from the power transmission system 10 according to the above-described embodiment in the structure of a tolerance ring 106 that is interposed between a rotor shaft 102 of the second electric motor MG2 and an output-side rotary shaft 104 and the arrangement position of the tolerance ring 106. Hereinafter, the structure around the tolerance ring 106, which differs from that of the above-described embodiment, will be described. The output-side rotary shaft 104 corresponds to the first rotary shaft according to the disclosure, and the rotor shaft 102 corresponds to the second rotary shaft according to the disclosure.

The rotor shaft 102 has an annular groove 110 on its inner periphery. The annular groove 110 is used to fit the tolerance ring 106 therein. The tolerance ring 106 is accommodated in an annular space defined by the annular groove 110. The tolerance ring 106 according to the present embodiment differs from the tolerance ring 54 according to the above-described embodiment in that protrusions are formed radially inward.

Figure 8:
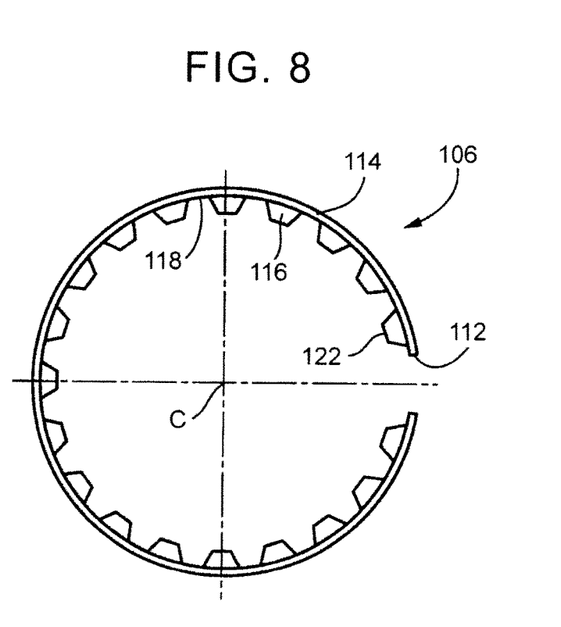
FIG. 8 is a view that shows the shape of a tolerance ring shown in FIG. 7.

FIG. 8 shows the shape of the tolerance ring 106. The tolerance ring 106 is made of a metal elastic material, and is formed in a substantially annular shape with a cutout 112 at part of the tolerance ring 106 in the circumferential direction. The tolerance ring 106 includes a substantially annular base 114 and a plurality of inward-directed protrusions 116 protruding radially inward from the base 114. Since the cutout 112 is partially formed in the circumferential direction, the base 114 is allowed to be elastically deformed. Therefore, the tolerance ring 106 is allowed to be fitted to the annular groove 110 of the rotor shaft 102 in advance by deforming the tolerance ring 106. The inward-directed protrusions 116 are arranged substantially at the center in the width direction of the base 114 (the direction perpendicular to the sheet in FIG. 8), and are caused to contact the output-side rotary shaft 104 after assembling. The inward-directed protrusions 116 are arranged at equal intervals in the circumferential direction, and a flat face 118 is formed between any adjacent inward-directed protrusions 116 in the circumferential direction. Each of the inward-directed protrusions 116 has a trapezoidal shape when viewed in the direction of the axis C, and has a contact face 122 at the radially inner side. The contact face 122 contacts the outer periphery of the output-side rotary shaft 104 after assembling. The hardness of the tolerance ring 106 is set to a value lower than the hardness of the outer peripheral surface of the output-side rotary shaft 104 and the hardness of the inner peripheral surface of the rotor shaft 102.

Referring back to FIG. 7, the rotor shaft 102 has a first inner peripheral spigot joint surface 124 at a position away from the annular groove 110 in which the tolerance ring 106 is accommodated in the direction of the axis C with reference to the inner peripheral teeth 42. That is, the rotor shaft 102 has the first inner peripheral spigot joint surface 124 at a back-side position across the annular groove 110 from the outer peripheral teeth 40 in the direction of the axis C. The rotor shaft 102 has a second inner peripheral spigot joint surface 126 between the inner peripheral teeth 42 and the annular groove 110 in the direction of the axis C. That is, the annular groove 110 in which the tolerance ring 106 is accommodated is provided between the first inner peripheral spigot joint surface 124 and the second inner peripheral spigot joint surface 126 in the direction of the axis C.

The output-side rotary shaft 104 has an outer peripheral spigot joint surface 128 on its outer periphery. The outer peripheral spigot joint surface 128 is fitted to the first inner peripheral spigot joint surface 124 and the second inner peripheral spigot joint surface 126 after assembling. The outer peripheral spigot joint surface 128 has such a length that the outer peripheral spigot joint surface 128 is fittable to the first inner peripheral spigot joint surface 124 and the second inner peripheral spigot joint surface 126 in the direction of the axis C. That is, the rotor shaft 102 has the first inner peripheral spigot joint surface 124 at a position away from the tolerance ring 106 in the direction of the axis C with reference to the spline fitting portion 52 after assembling. In addition, the output-side rotary shaft 104 has the outer peripheral spigot joint surface 128 that is fitted to the first inner peripheral spigot joint surface 124 after assembling. The first inner peripheral spigot joint surface 124 corresponds to an inner peripheral spigot joint surface according to the disclosure, the outer peripheral spigot joint surface 128 corresponds to the outer peripheral spigot joint surface and the second outer peripheral spigot joint surface according to the disclosure.

When the first inner peripheral spigot joint surface 124 and the second inner peripheral spigot joint surface 126 are fitted to the outer peripheral spigot joint surface 128, the first inner peripheral spigot joint surface 124 and the second inner peripheral spigot joint surface 126 are loosely fitted to the outer peripheral spigot joint surface 128. The dimensions (dimensional tolerances) of the first inner peripheral spigot joint surface 124, second inner peripheral spigot joint surface 126 and outer peripheral spigot joint surface 128 are set such that the first inner peripheral spigot joint surface 124 and the second inner peripheral spigot joint surface 126 are fitted to the outer peripheral spigot joint surface 128 without rattling. In FIG. 7, the portion at which the first inner peripheral spigot joint surface 124 and the outer peripheral spigot joint surface 128 are fitted to each other is defined as a first spigot joint portion 130, and the portion at which the second inner peripheral spigot joint surface 126 and the outer peripheral spigot joint surface 128 are fitted to each other is defined as a second spigot joint portion 132. The first spigot joint portion 130 and the second spigot joint portion 132 each have the same dimensional relationship. The first spigot joint portion 130 corresponds to the spigot joint portion according to the disclosure.

When the tolerance ring 106 is deformed between the output-side rotary shaft 104 and the rotor shaft 102 after assembling, friction resistance occurs at the contact faces of the output-side rotary shaft 104 and rotor shaft 102. For this reason, the output-side rotary shaft 104 and the rotor shaft 102 are held without rattling. Therefore, even in a state where looseness in the spline fitting portion 52 is not filled, the output-side rotary shaft 104 and the rotor shaft 102 are held by the tolerance ring 106 without rattling. For this reason, tooth hammer noise that occurs in the spline fitting portion 52 is reduced.

In the transition of assembling, in a state where the tolerance ring 106 is fitted to the annular groove 110 of the rotor shaft 102 in advance, the output-side rotary shaft 104 is inserted into the rotor shaft 102. At this time, the tolerance ring 106 contacts the outer peripheral spigot joint surface 128 and is compressed to be deformed, so a press-fit load occurs. When there is misalignment between the axis of the output-side rotary shaft 104 and the axis of the rotor shaft 102, for example, the tolerance ring 106 does not uniformly deform, with the result that the press-fit load further increases.

In contrast, the first inner peripheral spigot joint surface 124 of the rotor shaft 102 is provided on the opening side with respect to the annular groove 110 to which the tolerance ring 106 is fitted in the direction of the axis C, that is, on the back side (right side in FIG. 7) across the annular groove 110 from the second inner peripheral spigot joint surface 126 in the direction of the axis C. In other words, the first inner peripheral spigot joint surface 124 is provided at a position away from the annular groove 110 in the direction of the axis C with reference to the spline fitting portion 52. Therefore, at the time of inserting the output-side rotary shaft 104 into the rotor shaft 102 (in the transition of assembling), the first inner peripheral spigot joint surface 124 and the outer peripheral spigot joint surface 128 are fitted before the tolerance ring 106 contacts the outer peripheral spigot joint surface 128 of the output-side rotary shaft 104. At this time, the axes of the output-side rotary shaft 104 and rotor shaft 102 are aligned, so misalignment between the axes of these rotary shafts is prevented. This prevents an excessive increase in press-fit load that occurs at the time when the tolerance ring 106 contacts the outer peripheral spigot joint surface 128 of the output-side rotary shaft 104 and is compressed to be deformed.

The tolerance ring 106 is provided so as to be placed between the first spigot joint portion 130 and the second spigot joint portion 132 in the direction of the axis C after assembling. In this way, the output-side rotary shaft 104 and the rotor shaft 102 are held at two portions, that is, the first spigot joint portion 130 and the second spigot joint portion 132 that are provided on both sides of the tolerance ring 106 in the direction of the axis C. For this reason, misalignment between the axes of these rotary shafts after assembling is prevented. This prevents decentering of the output-side rotary shaft 104 and the rotor shaft 102 while these rotary shafts are being driven, and reduces a decentering load that acts on the tolerance ring 106 while these rotary shafts are being driven.

As described above, according to the present embodiment as well, similar advantageous effects to those of the above-described embodiment are obtained. Specifically, the tolerance ring 106 is interposed between the output-side rotary shaft 104 and the rotor shaft 102, so the output-side rotary shaft 104 and the rotor shaft 102 are held without rattling, with the result that it is possible to reduce tooth hammer noise that occurs in the spline fitting portion 52.

After assembling, the tolerance ring 106 is arranged so as to be sandwiched between the first spigot joint portion 82 and the second spigot joint portion 84 in the direction of the axis C. The output-side rotary shaft 104 and the rotor shaft 102 are held at two portions, that is, these first spigot joint portion 130 and second spigot joint portion 132. This prevents misalignment of the axes of these rotary shafts after assembling. This prevents decentering of the output-side rotary shaft 104 and the rotor shaft 102 while these rotary shafts are being driven, and reduces a decentering load that acts on the tolerance ring 106 while these rotary shafts are being driven.

At the time of inserting the output-side rotary shaft 104 into the rotor shaft 102, the first inner peripheral spigot joint surface 124 and the outer peripheral spigot joint surface 128 are fitted before the tolerance ring 106 contacts the outer peripheral spigot joint surface 128 of the output-side rotary shaft 104. At this time, the axes of the output-side rotary shaft 104 and rotor shaft 102 are aligned. This also prevents an excessive increase in press-fit load that occurs at the time when the tolerance ring 106 contacts the outer peripheral spigot joint surface 128 and is compressed to be deformed.

According to the present embodiment, the inward-directed protrusions 116 of the tolerance ring 106 contact the output-side rotary shaft 104 after assembling, so it is possible to hold the output-side rotary shaft 104 and the rotor shaft 102 without rattling.

Figure 9:
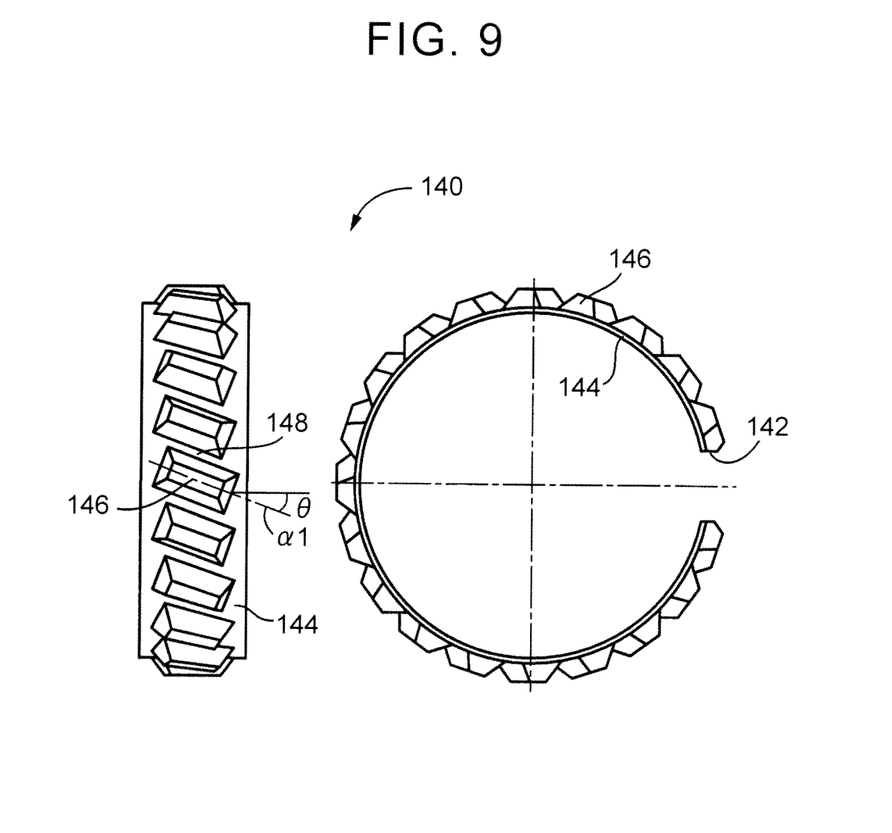
FIG. 9 is a view that shows another mode of a tolerance ring that is interposed between the output-side rotary shaft and a rotor shaft according to further another embodiment of the disclosure.

FIG. 9 shows the shape of a tolerance ring 140 that is interposed between the output-side rotary shaft 32 and the rotor shaft 34 according to further another embodiment of the disclosure. The tolerance ring 140 is made of a metal elastic material, and is formed in a substantially annular shape with a cutout 142 at part of the tolerance ring 140 in the circumferential direction. The tolerance ring 140 includes a substantially annular base 144 and a plurality of outward-directed protrusions 146 protruding radially outward from the base 144. The outward-directed protrusions 146 are arranged substantially at the center in the width direction of the base 144 (the horizontal direction in FIG. 9). The outward-directed protrusions 146 are arranged at equal intervals in the circumferential direction, and a flat face 148 is formed between any adjacent outward-directed protrusions 146 in the circumferential direction.

As shown in FIG. 9, each of the outward-directed protrusions 146 according to the present embodiment is arranged obliquely with respect to the width direction of the base 144. Specifically, when each outward-directed protrusion 146 is viewed from the radially outer side, a center line α1 extending parallel to the longitudinal direction of the outward-directed protrusion 146 is inclined at a predetermined angle θ with respect to the width direction of the base 144. The tolerance ring 140 is set such that the inner peripheral side of the tolerance ring 140 slips and no slip occurs between the top face of each outward-directed protrusion 146 and the rotor shaft 34.

When the tolerance ring 140 is formed as described above, the tolerance ring 140 rotates integrally with the output-side rotary shaft 32. Lubricating oil that is supplied to the annular groove 56 is smoothly drained so as to be pushed out by the inclined faces of the outward-directed protrusions 146 of the tolerance ring 140 when passing across the flat faces 148.

When the above-described tolerance ring 140 is interposed between the output-side rotary shaft 32 and the rotor shaft 34 as well, similar advantageous effects to those of the above-described embodiment are obtained. The outward-directed protrusions 146 of the tolerance ring 140 are arranged obliquely with respect to the width direction of the base 144, so, as the tolerance ring 140 rotates, lubricating oil passing through between the adjacent outward-directed protrusions 146 is smoothly drained so as to be pushed out by the inclined faces of the outward-directed protrusions 146.

Figure 10:
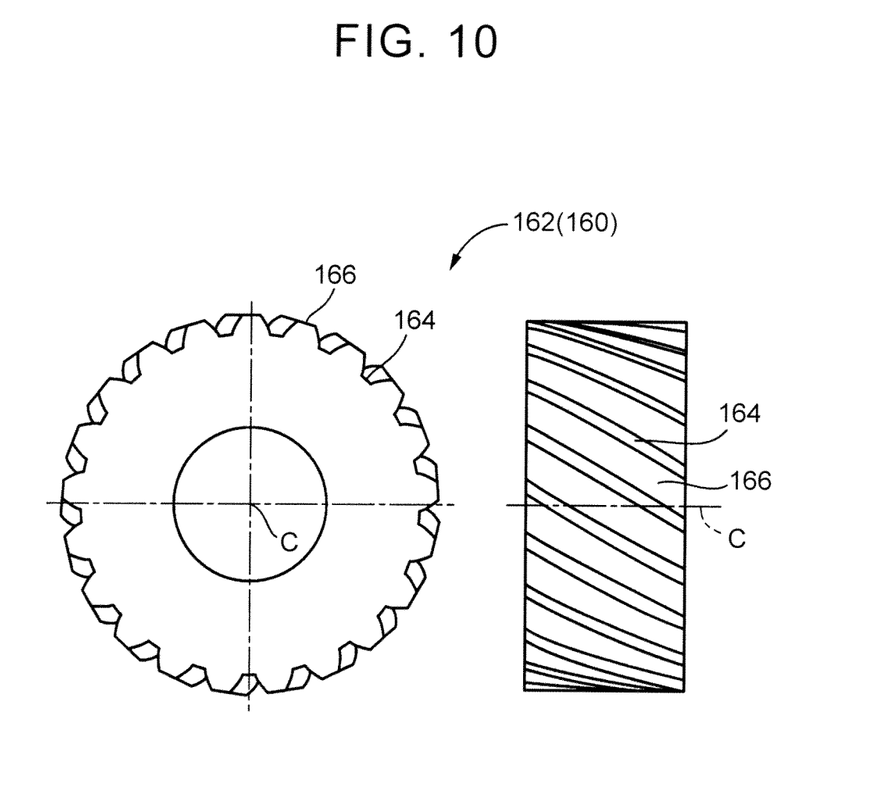
FIG. 10 is a view that shows the shape of a first outer peripheral spigot joint surface on the output-side rotary shaft according to further another embodiment of the disclosure.

FIG. 10 is a view that shows the shape of an outer peripheral spigot joint surface 162 that is provided on an output-side rotary shaft 160 according to further another embodiment of the disclosure. FIG. 10 corresponds to FIG. 6 according to the above-described embodiment. As shown in FIG. 10, grooves 164 provided on the outer peripheral spigot joint surface 162 are not parallel to the axis C but are oblique in the circumferential direction. That is, the circumferential position of each groove 164 varies with a position in the direction of the axis C. In this context, each of top faces 166 that are fitted to the inner periphery of the rotor shaft 34 is also oblique in the circumferential direction. The outer peripheral spigot joint surface 162 corresponds to the second outer peripheral spigot joint surface according to the disclosure.

When the above-described outer peripheral spigot joint surface 162 is applied instead of the above-described second outer peripheral spigot joint surface 78 as well, similar advantageous effects to those of the above-described embodiment are obtained. Since each of the grooves 164 of the outer peripheral spigot joint surface 162 is oblique in the circumferential direction, lubricating oil passing through the grooves 164 is smoothly drained so as to be pushed out from the grooves 164.

The embodiments of the disclosure are described in detail with reference to the accompanying drawings; however, the disclosure is also applied to other embodiments.

For example, in the above-described embodiment, the output-side rotary shaft 32 and the rotor shaft 34 are held by the first spigot joint portion 82 and the second spigot joint portion 84 on both sides of the tolerance ring 54; however, the second spigot joint portion 84 is not necessarily required in order to reduce a decentering load. In reducing a decentering load, the first spigot joint portion 82 away from the spline fitting portion 52 in the direction of the axis C just needs to be provided. Thus, the output-side rotary shaft 32 and the rotor shaft 34 are held by the spline fitting portion 52 and the first spigot joint portion 82 that is located at a position away from the spline fitting portion 52 in the direction of the axis C. For this reason, it is possible to prevent misalignment between the axes of these rotary shafts, so it is possible to reduce a decentering load while these rotary shafts are being driven. Similarly, the second spigot joint portion 132 is also not necessarily required. Misalignment between the axes of these rotary shafts is prevented by holding the output-side rotary shaft 104 and the rotor shaft 102 with the spline fitting portion 52 and the first spigot joint portion 130, so it is possible to reduce a decentering load while these rotary shafts are being driven.

In the above-described embodiments, each of the power transmission systems 10, 100 is a hybrid power transmission system including two electric motors; however, the disclosure is not always limited to a hybrid power transmission system according to the above-described embodiments. For example, the disclosure may be applied to a hybrid power transmission system including a single electric motor or a power transmission system including no electric motor. The disclosure is applicable to a power transmission system as long as the power transmission system includes a fitting portion at which pair of rotary shafts are fitted to each other and coupled to the power transmission system. For this reason, the disclosure is not limited to the spline fitting portion of the rotor shaft and output-side rotary shaft.

In the above-described embodiments, the automatic transmission 20 is a forward four-speed stepped transmission; however, the number of speed positions and the configuration of coupling inside are not specifically limited. Instead of the stepped automatic transmission 20, the disclosure may be applied to a continuously variable transmission, such as a belt-type continuously variable transmission.

In the above-described embodiment, the tolerance ring 140 is formed such that each outward-directed protrusion 146 is inclined with respect to the width direction of the base 144. Instead, as in the case of the tolerance ring 106, each inward-directed protrusion 116 may be inclined.

The above-described embodiments are only illustrative. The disclosure may be implemented in modes including various modifications or improvements on the basis of the knowledge of persons skilled in the art.

What is claimed is:

1. A power transmission system for a vehicle, the power transmission system comprising:
   a first rotary shaft;
   a second rotary shaft that has a cylindrical shape, the first rotary shaft and the second rotary shaft arranged around a common axis;
   a fitting portion at which outer peripheral teeth formed on an outer periphery of the first rotary shaft and inner peripheral teeth formed on an inner periphery of the second rotary shaft are fitted and coupled to each other so as to transmit power; and
   a tolerance ring arranged between the outer periphery of the first rotary shaft and the inner periphery of the second rotary shaft, wherein
     the second rotary shaft having an inner peripheral spigot joint surface, and
     the first rotary shaft having a first outer peripheral spigot joint surface and a second outer peripheral spigot joint surface, the first outer peripheral spigot joint surface being provided at a position away from the outer peripheral teeth and the tolerance ring in the direction of the common axis, and the second outer peripheral spigot joint surface being provided between the outer peripheral teeth and the tolerance ring in a direction of the common axis;
   wherein the inner peripheral spigot joint surface and the first outer peripheral spigot joint surface are fitted to each other, at a first spigot joint portion, and the inner peripheral spigot joint surface and the second outer peripheral spigot joint surface are fitted to each other, at a second spigot joint portion, so as to prevent a misalignment between the axis of the first rotary shaft and the axis of the second rotary shaft, and
   wherein a first distance in a radial direction between the first spigot joint portion and the common axis and a second distance in the radial direction between the second spigot joint portion and the common axis are the same, and each of the first and second distances in the radial direction is greater than a third distance in the radial direction between the fitting portion and the common axis.

2. The power transmission system according to claim 1, wherein
   the tolerance ring is accommodated in an annular groove arranged on the outer periphery of the first rotary shaft, and the tolerance ring includes outward-directed protrusions that contact the second rotary shaft.

3. A power transmission system for a vehicle, the power transmission system comprising:
   a first rotary shaft;
   a second rotary shaft that has a cylindrical shape, the first rotary shaft and the second rotary shaft arranged around a common axis;
   a fitting portion at which outer peripheral teeth formed on an outer periphery of the first rotary shaft and inner peripheral teeth formed on an inner periphery of the second rotary shaft are fitted and coupled to each other so as to transmit power; and
   a tolerance ring arranged between the outer periphery of the first rotary shaft and the inner periphery of the second rotary shaft, wherein
     the first rotary shaft having an outer peripheral spigot joint surface, and
     the second rotary shaft having a first inner peripheral spigot joint surface and a second inner peripheral spigot joint surface, the first inner peripheral spigot joint surface being provided at a position away from the inner peripheral teeth and the tolerance ring in the direction of the common axis, and the second inner peripheral spigot joint surface being provided between the inner peripheral teeth and the tolerance ring in a direction of the common axis;
   wherein the outer peripheral spigot joint surface and the first inner peripheral spigot joint surface are fitted to each other, at a first spigot joint portion, and the outer peripheral spigot joint surface and the second inner peripheral spigot joint surface are fitted to each other, at a second spigot joint portion, so as to prevent misalignment between the axis of the first rotary shaft and the axis of the second rotary shaft, and
   wherein a first distance in a radial direction between the first spigot joint portion and the common axis and a second distance in the radial direction between the second spigot joint portion and the common axis are the same, and each of the first and second distances in the radial direction is greater than a third distance in the radial direction between the fitting portion and the common axis.

4. The power transmission system according to claim 3, wherein
   the tolerance ring is accommodated in an annular groove arranged on the inner periphery of the second rotary shaft, and the tolerance ring includes inward-directed protrusions that contact the first rotary shaft.

* * * * *